(12) United States Patent
Sekito et al.

(10) Patent No.: US 7,661,953 B2
(45) Date of Patent: Feb. 16, 2010

(54) PROCESS FOR PRODUCING EXTERIOR MEMBER/SEAL MEMBER ASSEMBLY

(75) Inventors: Hisatoshi Sekito, Gunma (JP); Akihiro Toda, Gunma (JP); Kazuaki Morishita, Gunma (JP); Hideki Baba, Gunma (JP); Kazuhiro Hashimoto, Gunma (JP); Yasufumi Watanabe, Gunma (JP); Kazuo Irie, Gunma (JP)

(73) Assignee: Moriroku Kabushiki Kaisha, Tokyo (JP)

(*) Notice: Subject to any disclaimer, the term of this patent is extended or adjusted under 35 U.S.C. 154(b) by 53 days.

(21) Appl. No.: 11/400,528

(22) Filed: Apr. 10, 2006

(65) Prior Publication Data

US 2006/0188603 A1    Aug. 24, 2006

Related U.S. Application Data

(63) Continuation of application No. 10/392,390, filed on Mar. 20, 2003, now abandoned.

(30) Foreign Application Priority Data

Mar. 28, 2002    (JP) ............................... 2002-92689

(51) Int. Cl.
    *B29C 45/38*    (2006.01)
(52) U.S. Cl. .................. 425/577; 425/441; 425/443; 425/451.9; 264/328.7
(58) Field of Classification Search ............ 425/577, 425/578, 406, 412, 422, 441, 443, 255, 328.7, 425/328.8, 415–417, 451.9; 264/255, 328.7, 264/328.8, 328.1, 328.11
    See application file for complete search history.

(56) References Cited

U.S. PATENT DOCUMENTS 4,021,515 A * 5/1977 Neuman .................... 264/40.5
4,173,362 A * 11/1979 Glover et al. ............... 285/110

(Continued)

FOREIGN PATENT DOCUMENTS

JP          6-143333          5/1994

(Continued)

*Primary Examiner*—Steven P Griffin
*Assistant Examiner*—Seyed Masoud Malekzadeh
(74) *Attorney, Agent, or Firm*—Arent Fox LLP

(57) ABSTRACT

A process for producing an exterior member/seal member assembly includes: a first step of moving a slide core to protrude into a major cavity defined between first and second dies and, and injecting a hard synthetic resin into an exterior-member forming cavity partitioned in the major cavity; and a second step of retracting the slide core and injecting a soft synthetic resin into a seal-member forming cavity which is a remaining portion of the major cavity. An outer-seal-lip forming portion is connected to an outer end of the seal-member forming cavity; a recess-shaped step is formed on one side face of the slide core and adapted to define an inner-seal-lip forming portion leading to the seal-member forming cavity between the step and an inner surface of a guide bore in the second die when the slide core is retracted; and the soft synthetic resin is filled into the outer and inner-seal-lip forming portions 15 and 16 at the second step. Thus, the seal member having the pair of inner and outer seal lips can be formed and coupled to the exterior member by one stroke of the seal-member forming step, and complication of the forming step can be avoided.

1 Claim, 10 Drawing Sheets

U.S. PATENT DOCUMENTS

| | | | |
|---|---|---|---|
| 4,201,209 A * | 5/1980 | LeVeen et al. | 604/218 |
| 4,278,417 A * | 7/1981 | Wilds et al. | 425/577 |
| 4,385,025 A * | 5/1983 | Salerno et al. | 264/255 |
| 4,410,479 A * | 10/1983 | Cyriax | 264/255 |
| 4,452,420 A * | 6/1984 | Lundquist | 249/175 |
| 4,460,534 A * | 7/1984 | Boehm et al. | 264/246 |
| 4,576,568 A * | 3/1986 | Grannen, III | 425/577 |
| 4,676,941 A * | 6/1987 | Shiho et al. | 264/247 |
| 4,726,758 A * | 2/1988 | Sekine et al. | 425/575 |
| 4,820,149 A * | 4/1989 | Hatakeyama et al. | 425/555 |
| 4,840,760 A * | 6/1989 | Oishi | 264/245 |
| 4,952,130 A * | 8/1990 | Reil | 425/117 |
| 4,990,077 A * | 2/1991 | Morita | 425/130 |
| 5,094,602 A * | 3/1992 | Morita | 425/130 |
| 5,251,954 A | 10/1993 | Kopple et al. | |
| 5,346,387 A * | 9/1994 | Muller et al. | 425/543 |
| 5,456,957 A * | 10/1995 | Jackson et al. | 428/31 |
| 5,458,957 A * | 10/1995 | Fryszer et al. | 442/1 |
| 5,662,854 A * | 9/1997 | Katagiri et al. | 264/255 |
| 5,670,184 A * | 9/1997 | Nakamichi et al. | 425/130 |
| 6,027,328 A * | 2/2000 | Herbst | 425/553 |
| 6,123,889 A * | 9/2000 | Katagiri et al. | 264/255 |
| 6,143,237 A * | 11/2000 | Eckardt et al. | 264/572 |
| 6,375,891 B1 * | 4/2002 | Nishikawa et al. | 264/534 |
| 6,866,811 B2 * | 3/2005 | Kayano et al. | 264/513 |
| 7,008,585 B2 * | 3/2006 | Romanello | 264/155 |
| 7,462,314 B2 * | 12/2008 | Feick | 264/255 |
| 2001/0050450 A1 * | 12/2001 | Kayano et al. | 264/513 |

FOREIGN PATENT DOCUMENTS

JP        2000-6732        1/2000

* cited by examiner

PROCESS FOR PRODUCING EXTERIOR MEMBER/SEAL MEMBER ASSEMBLY

CROSS-REFERENCE TO RELATED APPLICATIONS

This is a Continuation Application, which claims the benefit of U.S. patent application Ser. No. 10/392,390, filed Mar. 20, 2003, now abandoned which in turn claims priority to foreign application No. 2002-92689 filed in Japan on Mar. 28, 2002. The disclosures of the prior applications are hereby incorporated herein in their entirety by reference.

BACKGROUND OF THE INVENTION

1. Field of the Invention

The present invention relates to an improvement in a process for producing an exterior member/seal member assembly comprising an exterior member made of a hard synthetic resin and a seal member made of a soft synthetic resin and coupled to one end of said exterior member, said process comprising: a first step of moving a slide core slidably mounted in a guide bore in a second die so that it protrudes into a major cavity defined between a first die and the second die, and injecting a hard synthetic resin into an exterior-member forming cavity partitioned in the major cavity to form an exterior member; and a second step of retracting the slide core out of the major cavity and injecting a soft synthetic resin into a seal-member forming cavity, which is a remaining portion of the major cavity, to form a seal member.

2. Description of the Related Art

Such process for producing an exterior member/seal member assembly is already known, for example, as disclosed in Japanese Patent Application Laid-open No. 6-143333.

In the known process for producing the exterior member/seal member assembly, it is not taken into consideration to form a pair of seal lips on an inner surface of a seal member in order to enhance the sealing function of the seal member of the exterior member/seal member assembly.

SUMMARY OF THE INVENTION

Accordingly, it is an object of the present invention to provide a process of the above-described type for producing an exterior member/seal member assembly, wherein a pair of seal lips can be formed easily on an inner surface of a seal member of the exterior member/seal member assembly.

To achieve the above object, according to a first feature of the present invention, there is provided a process for producing an exterior member/seal member assembly comprising an exterior member made of a hard synthetic resin and a seal member made of a soft synthetic resin and coupled to one end of said exterior member, said process comprising: a first step of moving a slide core slidably mounted in a guide bore in a second die so that it protrudes into a major cavity defined between a first die and the second die, and injecting a hard synthetic resin into an exterior-member forming cavity partitioned in the major cavity to form an exterior member; and a second step of retracting the slide core out of the major cavity and injecting a soft synthetic resin into a seal-member forming cavity, which is a remaining portion of the major cavity, to form a seal member, wherein an outer-seal-lip forming portion is connected to an outer end of the seal-member forming cavity to protrude toward the second die; a recess-shaped step is formed on one side face of the slide core and adapted to define an inner-seal-lip forming portion leading to the seal-member forming cavity between said step and an inner surface of the guide bore in the second die when the slide core is retracted; and the soft synthetic resin is filled into the outer and inner-seal-lip forming portions at the second step.

The exterior member corresponds to a cowl top 2 in the embodiments of the present invention, which will be described below, and the exterior-member forming cavity corresponds to a cowl-top forming cavity 12a in the embodiments.

With the first feature, the seal member having the pair of inner and outer seal lips can be formed and coupled to the exterior member by one stroke of the seal-member forming step. Further, an enhanced sealing function can be imparted to the seal member, while avoiding complication of the forming step. Moreover, the shape and size of the inner seal lip can be adjusted by changing the shape and size of the recess-shaped step of the slide core, that is, the shape and size of the inner seal lip can be changed by replacing only the slide core with a relatively low cost.

According to a second feature of the present invention, in addition to the first feature, the recess-shaped step is adapted to face the exterior-member forming cavity when the slide core is moved to protrude into the major cavity.

With the second feature, joint faces of the exterior member and the seal member correspond to the shape of the recess-shaped step of the slide core, and a large joint area can be provided to contribute to an increase in bonding strength between the exterior member and the seal member.

The above and other objects, features and advantages of the invention will become apparent from the following detailed description of the preferred embodiments taken in conjunction with the accompanying drawings.

DESCRIPTION OF THE PREFERRED EMBODIMENTS

The present invention will now be described by way of preferred embodiments with reference to the accompanying drawings.

A first embodiment of the present invention shown in FIGS. 1 to 5 will be first described.

Figure 1:
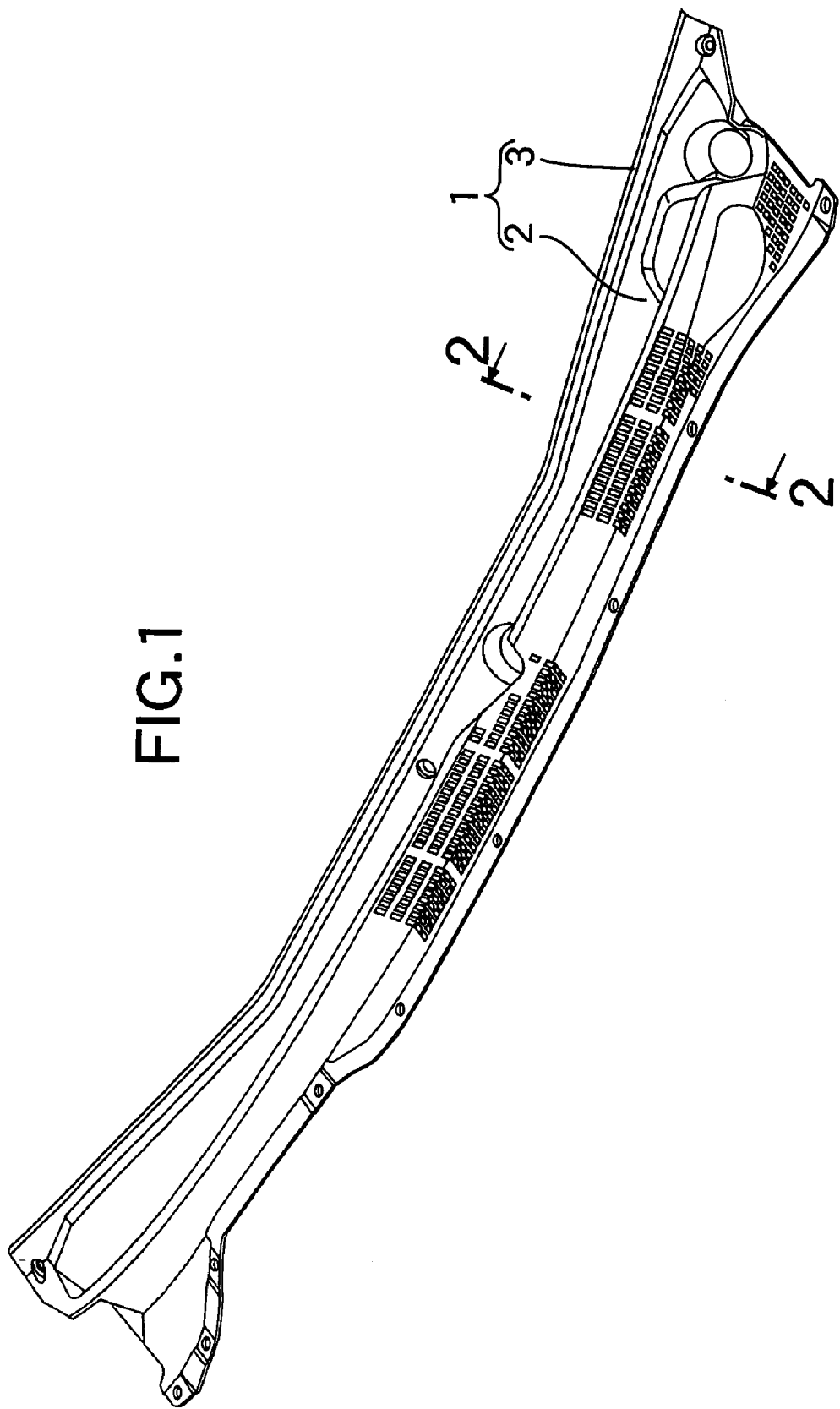
FIG. 1 is a perspective view of a cowl top/seal member assembly to be produced by a producing process according to a first embodiment of the present invention.
Figure 2:
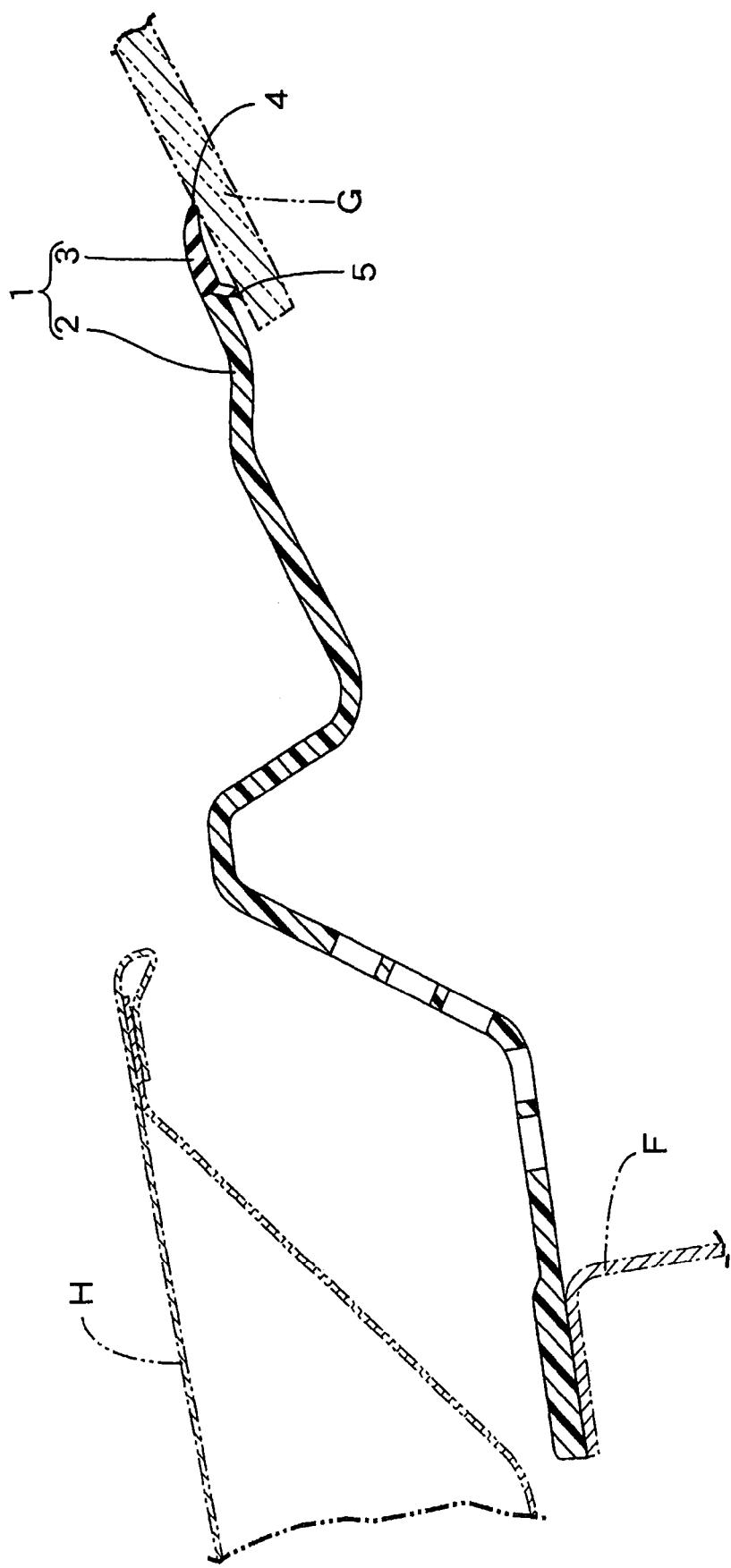
FIG. 2 is a sectional view taken along a line 2-2 in FIG. 1.

FIGS. 1 and 2 show a cowl top/seal member assembly 1 which is to be produced by a producing process according to the first embodiment of the present invention. The cowl top/seal member assembly 1 is a part to be disposed in an area extending from an upper surface of a lower end of a windshield glass G of an automobile to a vehicle body frame F at a lower portion of a rear end of an engine bonnet H. The cowl top/seal member assembly 1 is comprised of a cowl top 2 made of a hard synthetic resin and secured to the vehicle body frame, and a seal member 3 made of a soft synthetic resin and coupled to a rear end of the cowl top 2. The seal member 3 is integrally provided with a pair of inner and outer seal lips 4 and 5 adapted to be brought into close contact with an outer surface of the windshield glass G. One of the seal lips is an outer seal lip 4 protruding from an outer edge of the seal member 3 toward an inner side of the seal member 3. The other seal lip is an inner seal lip 5 protruding from the inner side of the seal member 3 at a location displaced from the outer seal lip 4 toward the cowl top 2.

A process for producing the cowl top/seal member assembly 1 will be described with reference to FIGS. 3 to 6.

Figure 3:
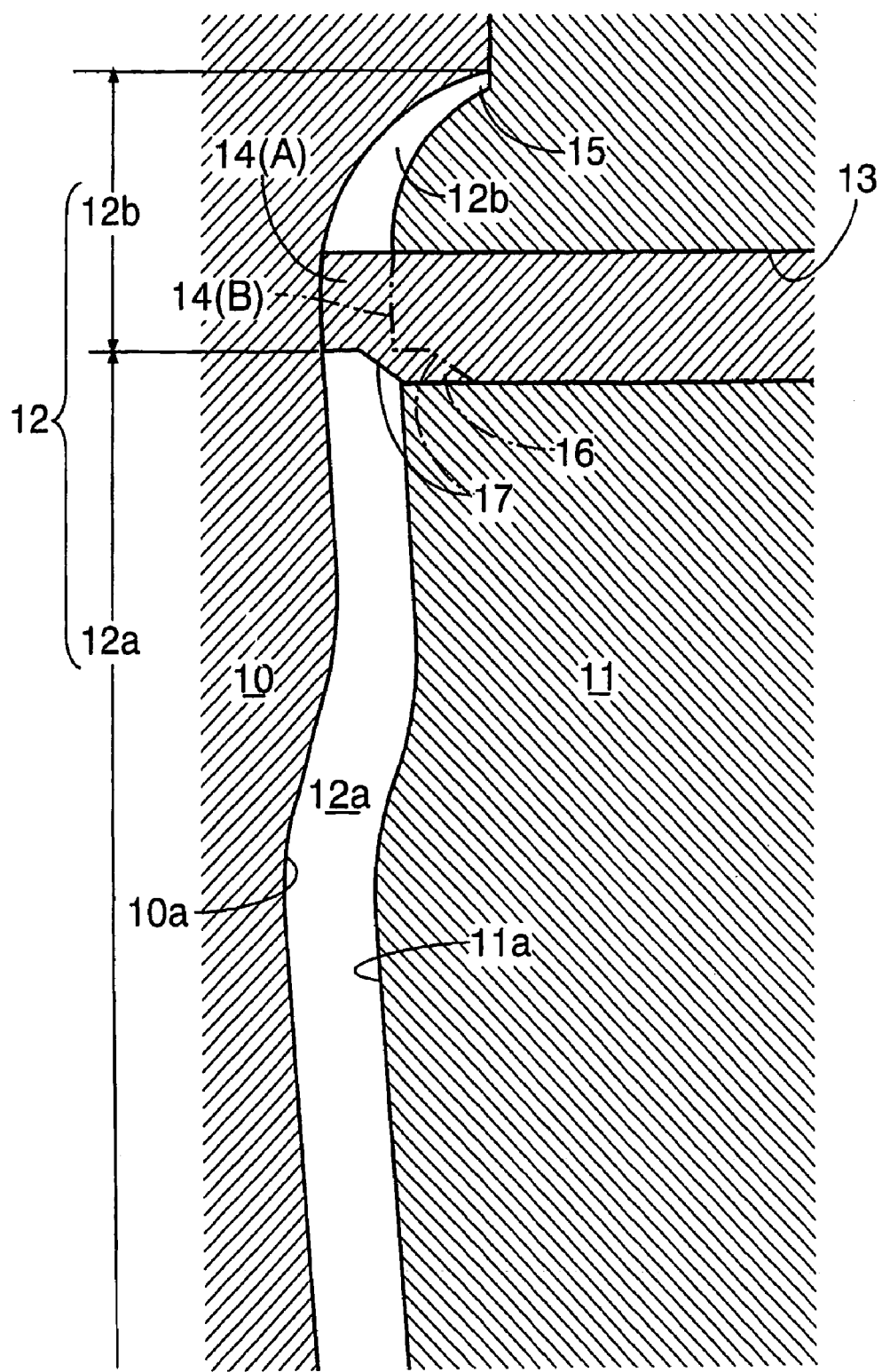
FIG. 3 is a vertical sectional view of a die device used in the producing process according to the first embodiment of the present invention.
Figure 5:
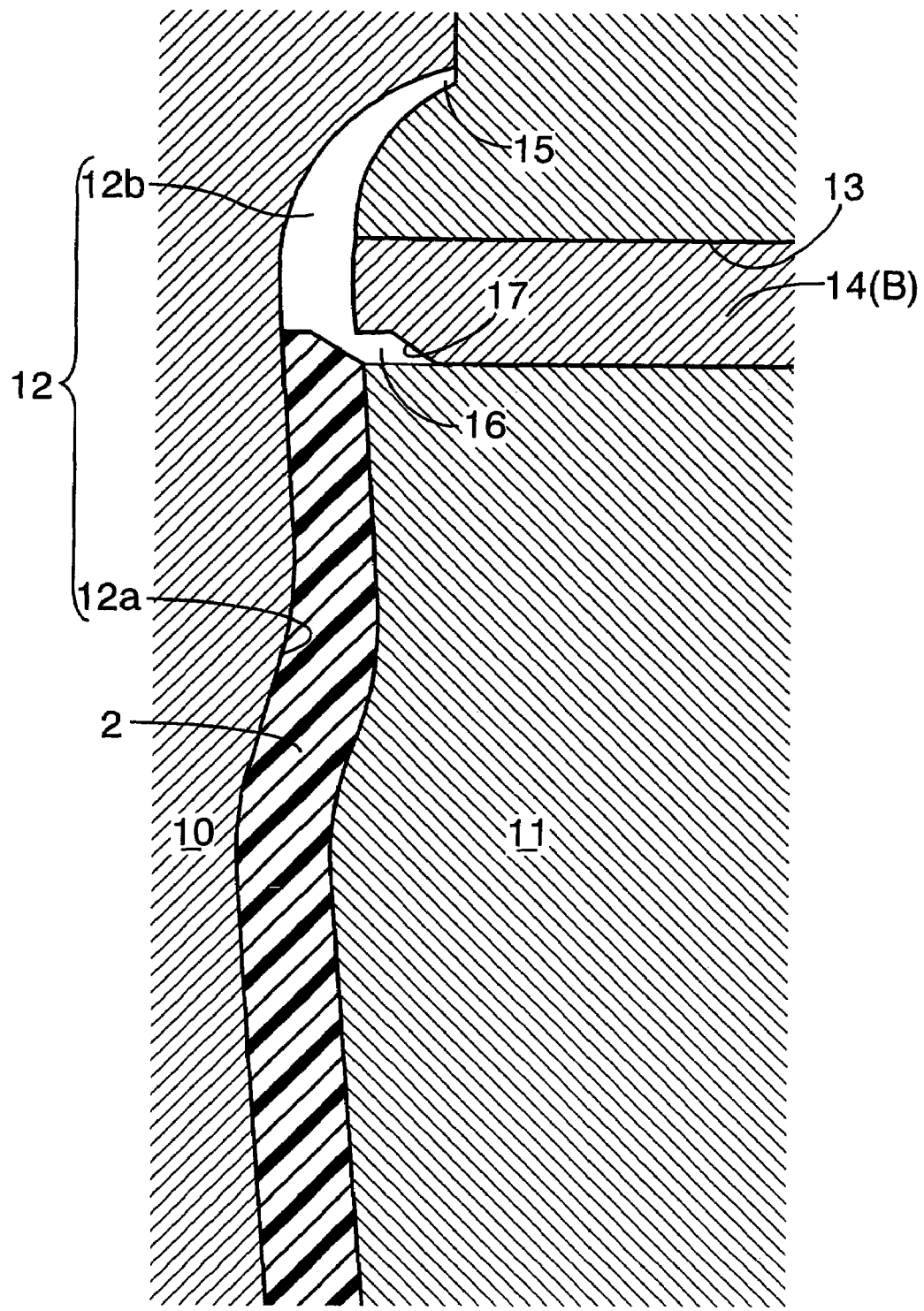
FIG. 5 is a vertical sectional view showing a state immediately before the formation of a seal member.

First, a die device used for producing the cowl top/seal member assembly 1 will be described. As shown in FIGS. 3 and 5, the forming device includes first and second dies 10 and 11 which are openably and closably opposed to each other. An inner surface 10a of the first die 10 is provided with a shape corresponding to an outer side of the cowl/seal member assembly 1. An inner surface 11a of the second die 11 is provided with a shape corresponding to an inner side of the cowl/seal member assembly 1. When both the dies 10 and 11 are closed, a major cavity 12 corresponding to the shape of the cowl/seal member assembly 1 is defined by the inner sides 10a and 11a.

A slide core 14 is disposed in a guide bore 13 in the second die 11 for advancing and retracting into and out of the major cavity 12, and adapted to divide the major cavity 12 so that a portion of the major cavity 12 can serve as a cowl-top forming cavity 12a corresponding to the shape of the cowl top 2. Namely, the slide core 14 can be moved along the guide bore 13 between an advanced position A at which its tip end face abut against the inner surface 10a of the first die 10, and a retracted position B at which its tip end face is flush with the inner surface 11a of the second die 11. A portion of the major cavity 12 is partitioned to be the cowl-top forming cavity 12a corresponding to the shape of the cowl top 2 by moving the slide core 14 into the advanced position A.

When the slide core 14 is moved into the retracted position B, a remaining portion of the major cavity 12, i.e., a portion other than the cowl-top forming cavity 12a becomes a seal-member forming cavity 12b corresponding to the shape of the seal member 3. In this structure, ends of the inner surfaces 10a and 11a are bent toward the second die 11 so that an outer-seal-lip forming portion 15 corresponding to the shape of the outer seal lip 4 of the seal member 3 is made at an outer end of the seal-member forming cavity 12b.

A recess-shaped step 17 is formed on a side face of the tip end of the slide core 14 adjacent the cowl-top forming cavity 12a so that when the slide core 14 reaches the retracted position B, an inner-seal-lip forming portion 16 corresponding to the shape of the inner seal lip 5 of the seal member 3 is defined between the recess-shaped step 17 and one side face of the guide bore 13 corresponding to the recess-shaped step 17.

The first die 10 or the second die 11 is provided with first and second gates (not shown), from which resin materials for the cowl top 2 and the seal member 3 can be injected individually into the cowl-top forming cavity 12a and the seal-member forming cavity 12b.

Figure 4:
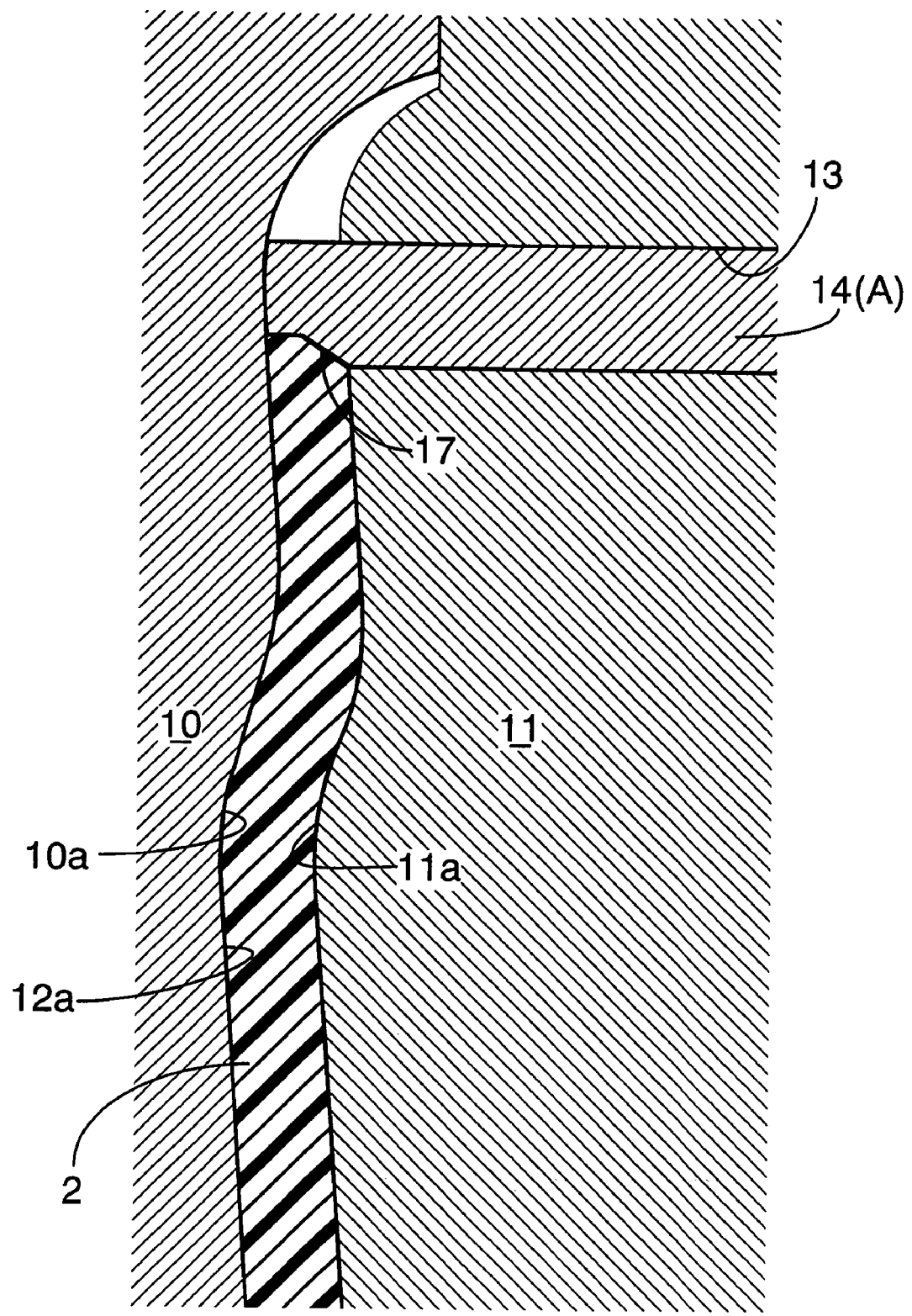
FIG. 4 is a vertical sectional view showing a cowl-top forming step carried out in the die device.

To produce the cowl top/seal member assembly 1, as shown in FIG. 3, the first and second dies 10 and 11 are first closed, and the slide core 14 is moved into the advanced position A to define the cowl-top forming cavity 12a by the inner surfaces 10a and 11a of the first and second dies 10 and 11 as well as the recess-shaped step 17 of the slide core 14. Subsequently, a hard synthetic resin (for example, PP) in a molten state is injected from the first gate (not shown) into the cowl-top forming cavity 12a to form a cowl top 2, as shown in FIG. 4.

Figure 6:
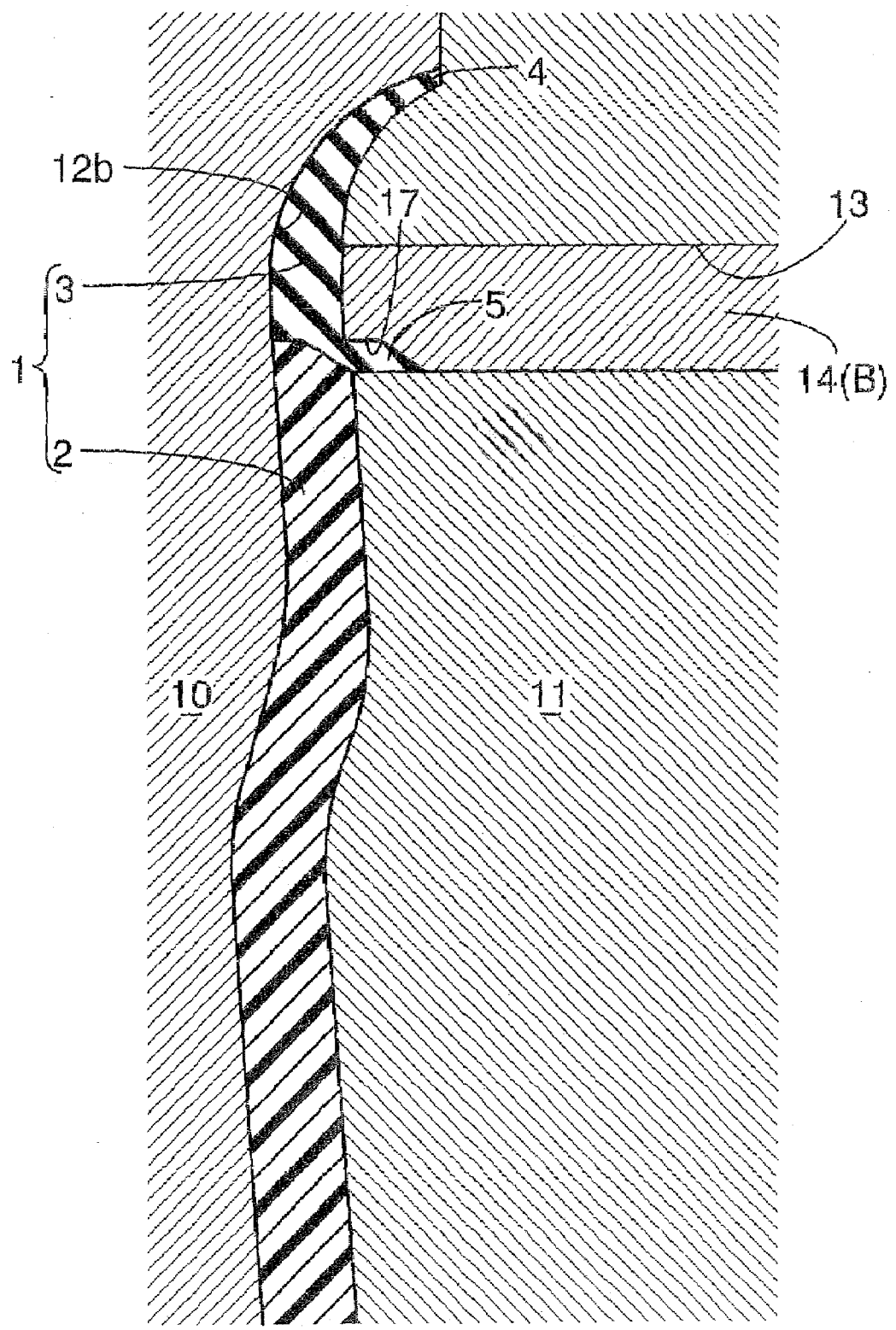
FIG. 6 is a vertical sectional view showing a seal-member forming step.

Then, as shown in FIG. 5, the slide core 14 is moved into the retracted position B while the first and second dies 10 and 11 are kept closed, whereby the seal-member forming cavity 12b faced by one end of the cowl top 2 is defined between the dies 10 and 11. Subsequently, a soft synthetic resin (for example, TPO) in a molten state and having a compatibility with the material for the cowl top 2 is injected from the second gate (not shown) into the seal-member forming cavity 12b to form a seal member 3, as shown in FIG. 6. Thus, the cowl top/seal member assembly 1 is completed.

Thereafter, the first and second dies 10 and 11 are opened, and the cowl top/seal member assembly 1 is removed.

The materials for the cowl top 2 and the seal member 3 have the compatibility with each other, and hence the cowl top 2 and the seal member 3 can be fused and integrally coupled to each other at joint faces.

Moreover, the joint faces of the cowl top 2 and the seal member 3 correspond to the shape of the recess-shaped step 17 of the slide core 14, and hence a large joint area can be secured, thereby increasing the bonding strength between the cowl top 2 and the seal member 3.

Further, the use of the slide core 14 having the recess-shaped step 17 ensure that the seal member 3 having the pair of inner and outer seal lips 4 and 5 can be formed and coupled to the cowl top 2 by one stroke of a seal-member forming step, and an enhanced sealing function can be imparted to the seal member 3 while avoiding complication of the forming step.

The shape and size of the inner seal lip 5 can be adjusted by changing the shape and size of the recess-shaped step 17 of the slide core 14, and hence the shape and size of the inner seal lip 5 can be changed by replacing only the slide core 14 with a relatively low cost.

A second embodiment of the present invention will be described with reference to FIGS. 7 to 10.

A forming device in the second embodiment is similar to the forming device in the first embodiment, except that a recess-shaped step 17 is formed on a side face of a tip end of a slide core 14 adjacent the outer seal lip 4, and an inner-seal-lip forming portion 16 is defined by the recess-shaped step 17 and an inner side face of the guide bore 13 adjacent the outer seal lip 4. Therefore, portions or components corresponding to those in the first embodiment are designated by the same reference numerals in FIGS. 7 to 10, and the description of them is omitted.

Figure 7:
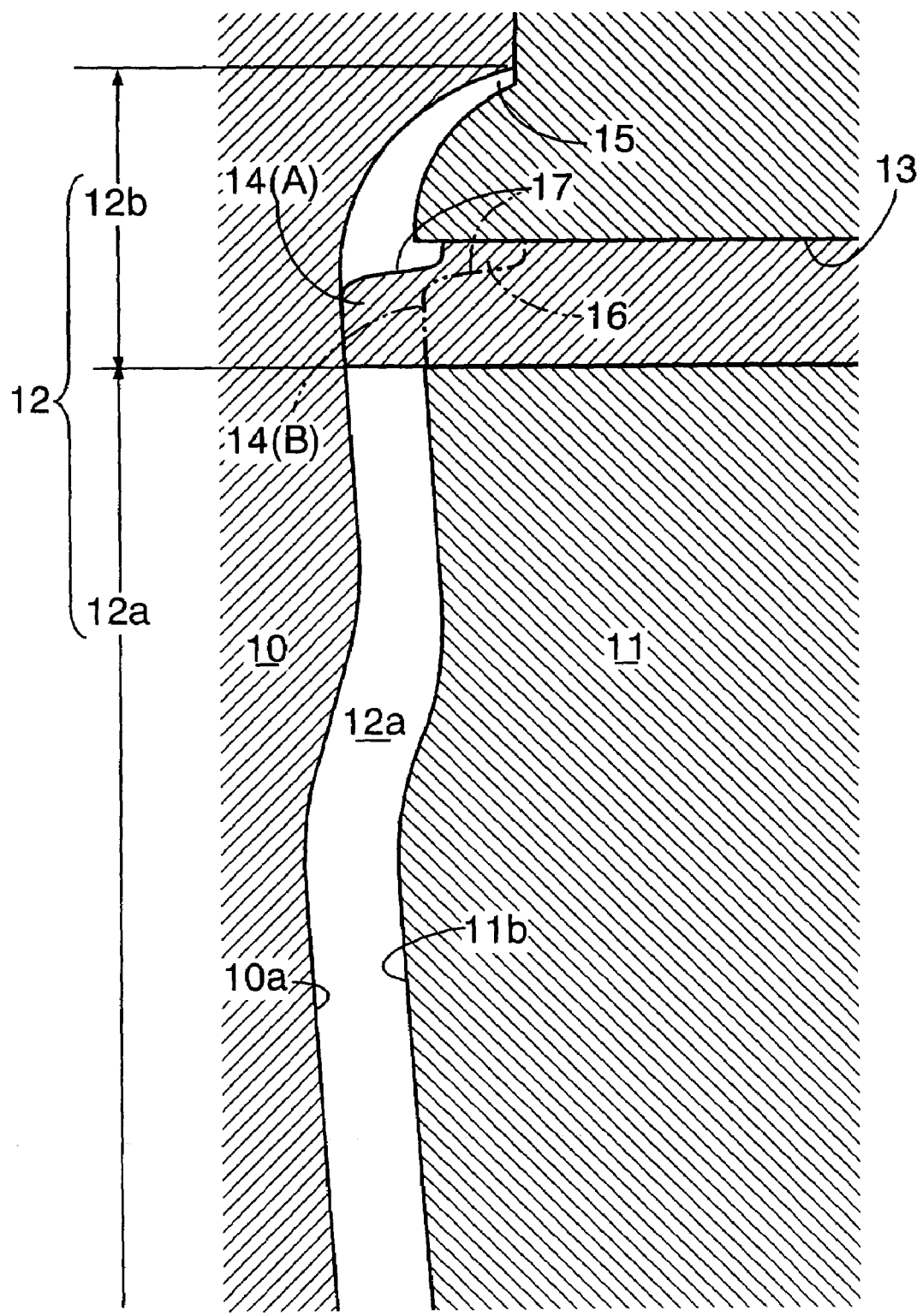
FIG. 7 is a perspective view of a cowl top/seal member assembly to be produced by a producing process according to a second embodiment of the present invention.
Figure 8:
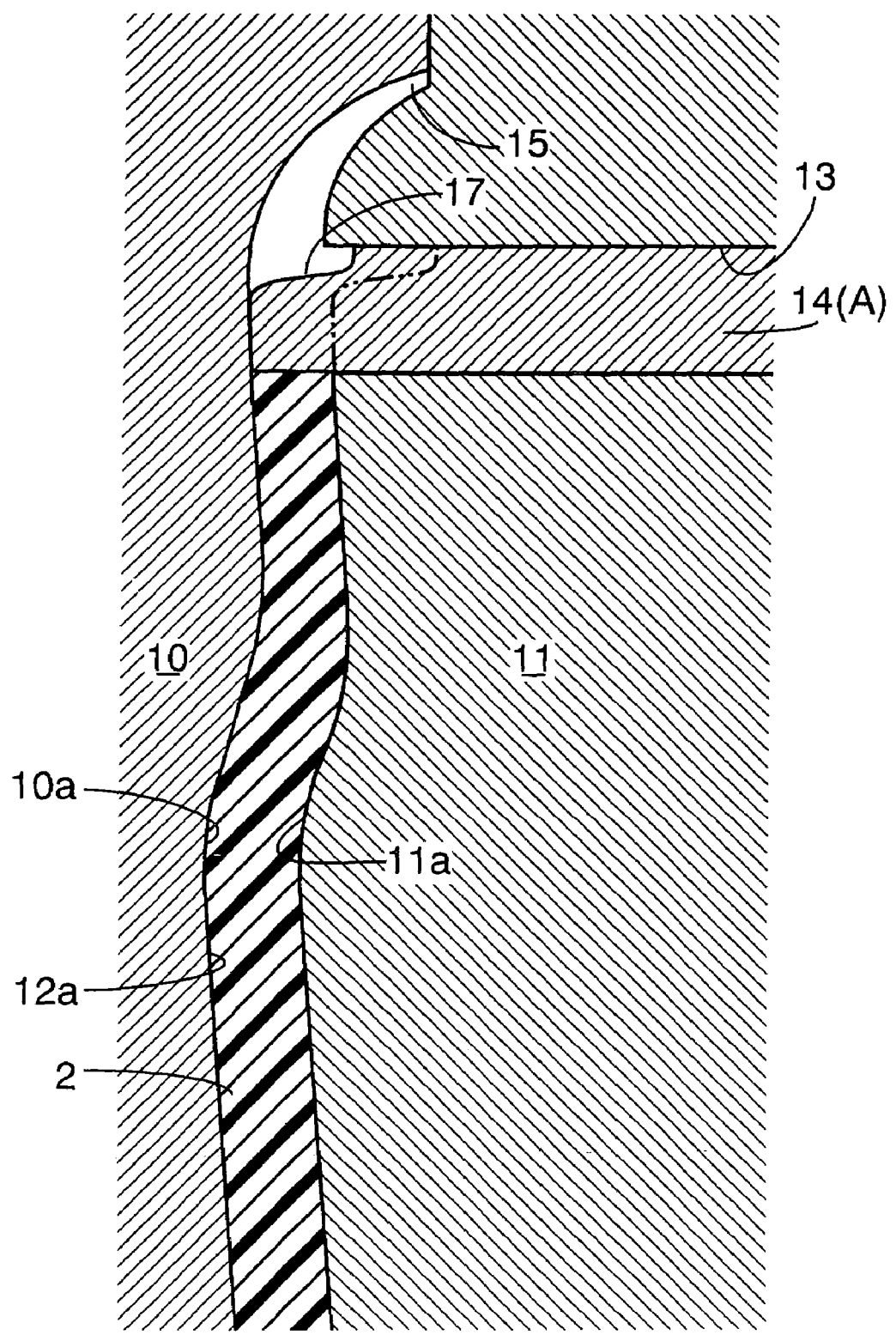
FIG. 8 is a vertical sectional view showing a cowl-top forming step carried out in the die device.

Also in the second embodiment, to produce a cowl top/seal member assembly 1, as shown in FIG. 7, the first and second dies 10 and 11 are first closed, and the slide core 14 is moved into the advanced position A to define the cowl-top forming cavity 12a. Then, as shown in FIG. 8, a hard synthetic resin in a molten state is injected into the cowl-top forming cavity 12a to form a cowl top 2.

Figure 9:
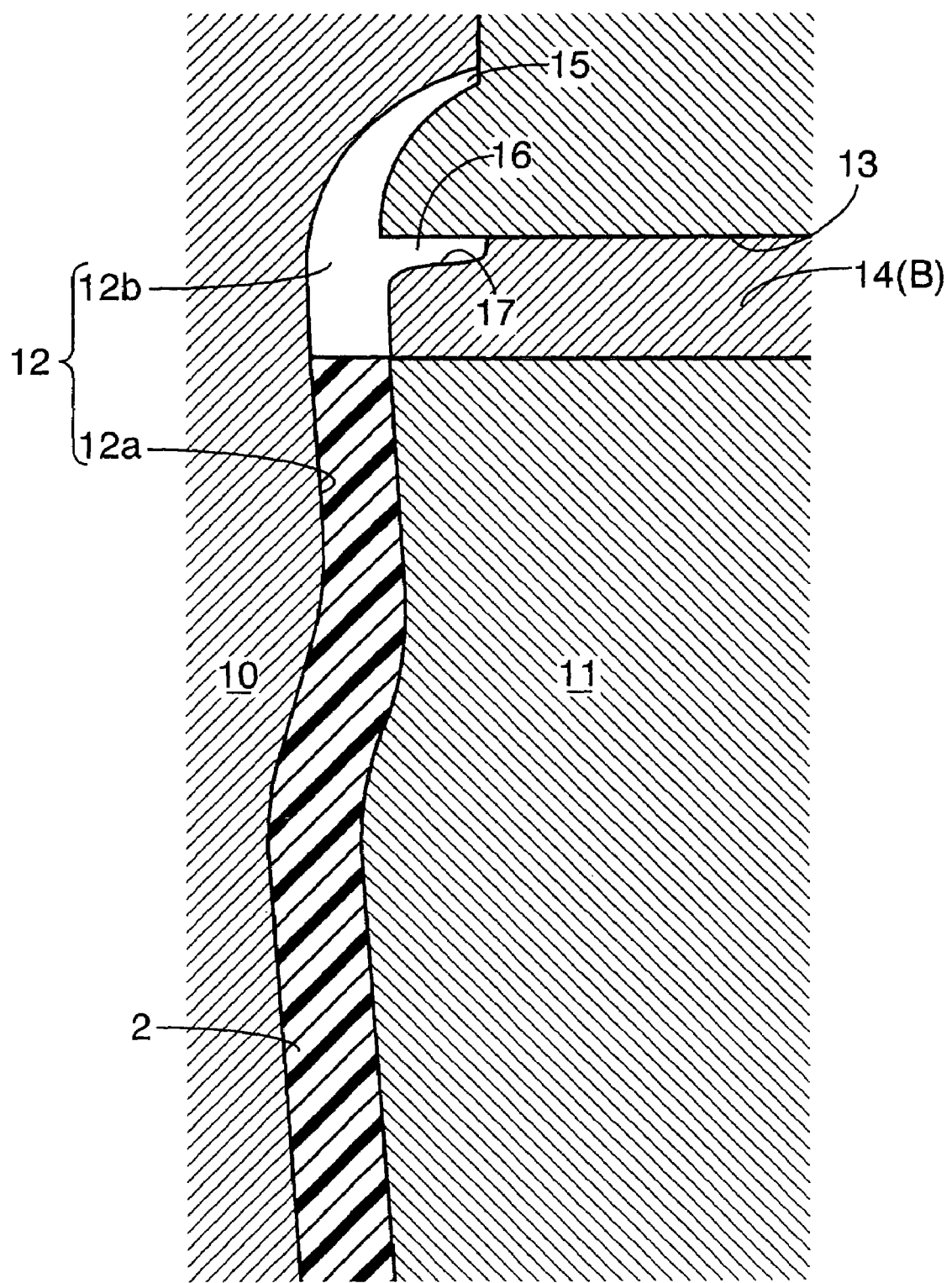
FIG. 9 is a vertical sectional view showing a state immediately before the formation of a seal member.
Figure 10:
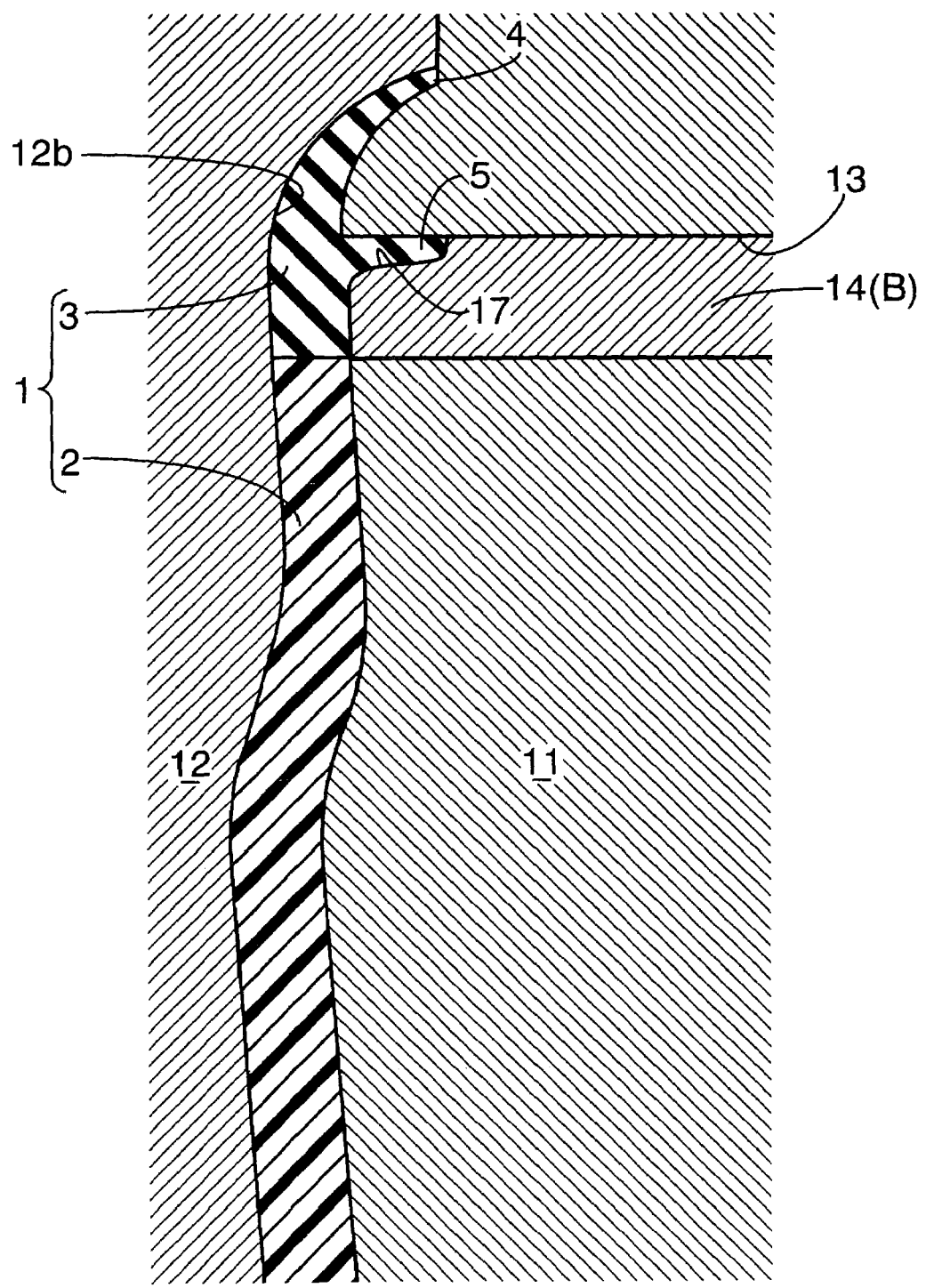
FIG. 10 is a vertical sectional view showing a seal-member forming step.

Then, as shown in FIG. 9, the slide core 14 is moved into the retracted position B while the first and second dies 10 and 11 are kept closed, whereby the seal-member forming cavity 12b faced by one end of the cowl top 2 is created. Subsequently, a soft synthetic resin in a molten state and having a compatibility with the material for the cowl top 2 is injected into the seal-member forming cavity 12b to form a seal member 3, as shown in FIG. 10. Thus, the cowl top/seal member assembly 1 is completed. Thereafter, the first and second dies 10 and 11 are opened, and the cowl top/seal member assembly 1 is removed.

Also in the second embodiment, the seal member 3 having the pair of inner and outer seal lips 4 and 5 can be formed and coupled to the cowl top 2 by one stroke of a seal-member forming step, and an enhanced sealing function can be imparted to the seal member while avoiding complication of the forming step.

It will be understood that the present invention is not limited to the above-described embodiments, and various modifications in design may be made without departing from the spirit and scope of the invention defined in the claims.

What is claimed is:

1. A die device for producing an exterior member/seal member assembly, said die device comprising:
   a first die comprising a first inner surface having a curved end portion;
   a second die comprising a second inner surface having a curved end portion, the second die cooperating with the first die to define a cavity between said first and second dies; and
   a slide core slidably mounted in a guide bore formed in the second die, wherein the slide core slidably projects into and retracts from the cavity,
   wherein the slide core comprises a recess-shaped portion at a side surface thereof and a top end portion connected to the recess-shaped portion abutting the first inner surface of the first die when the slide core projects into the cavity, dividing the cavity into two regions, a first region and a second region,
   wherein the curved end portion of the first inner surface of the first die and the curved end portion of the second inner surface of the second die are curved toward the second die and define a tapered portion of the second region that terminates at an end of the cavity where the first die abuts the second die,
   wherein at a position of the slide core being retracted into the guide bore the top end portion of the slide core is located flush with the second inner surface of the second die and extends a back surface of the second region and the second region expands to communicate with a space between the recess-shaped portion of the slide core and an inner wall of the guide bore, so that a space for molding the seal member is defined among the first inner surface of the first die, the second inner surface of the second die, the top end portion of the slide core, the recess-shaped portion of the slide core and the inner wall of the guide bore facing the recess-shaped portion, and
   wherein the recess-shaped portion of the slide core defines an end portion of the first region when the slide core projects into the main cavity.

* * * * *